(12) United States Patent
Mair

(10) Patent No.: US 9,181,885 B2
(45) Date of Patent: Nov. 10, 2015

(54) METHOD FOR CONTROLLING THE LOCOMOTION OF A MOTOR VEHICLE

(75) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 298 days.

(21) Appl. No.: 13/642,244

(22) PCT Filed: Mar. 2, 2011

(86) PCT No.: PCT/EP2011/053113
§ 371 (c)(1),
(2), (4) Date: Oct. 19, 2012

(87) PCT Pub. No.: WO2011/131406
PCT Pub. Date: Oct. 27, 2011

(65) Prior Publication Data
US 2013/0041562 A1  Feb. 14, 2013

(30) Foreign Application Priority Data
Apr. 22, 2010  (DE) .......................... 10 2010 028 071

(51) Int. Cl.
*G06F 7/00*  (2006.01)
*G06F 17/00*  (2006.01)
(Continued)

(52) U.S. Cl.
CPC ........... *F02D 41/0007* (2013.01); *B60W 10/02* (2013.01); *B60W 10/06* (2013.01);
(Continued)

(58) Field of Classification Search
CPC .................... F02D 41/0007; B60W 10/02
USPC .................. 701/22, 54; 477/107, 175, 70
See application file for complete search history.

(56) References Cited

U.S. PATENT DOCUMENTS 6,519,522 B1  2/2003  Wolf et al.
6,692,406 B2  2/2004  Beaty
(Continued)

FOREIGN PATENT DOCUMENTS

DE  198 39 837 A1  3/2000
DE  101 39 122 A1  3/2002
(Continued)

OTHER PUBLICATIONS

German Office Action issued in corresponding German Application No. 10 2010 028 0712 mailed on Jan. 10, 2014.
(Continued)

*Primary Examiner* — Tuan C. To
*Assistant Examiner* — Isaac Smith
(74) *Attorney, Agent, or Firm* — Davis & Bujold, P.L.L.C.; Michael J. Bujold (57) ABSTRACT

A method for drive control of a motor vehicle in a drive train which comprises a drive engine built as a turbo-charged internal combustion engine, a startup and shifting clutch built as an automated friction clutch, and a transmission built as an automatic stepped transmission. The method overcomes drive engine torque deficiencies while traveling in which such torque deficiencies occur when the driver demands power corresponding to a target torque of the drive engine which is above the spontaneously attainable maximum torque. To avoid downshifting or starting from standstill, initially the clutch is disengaged up to slipping operation, the drive engine is then accelerated to the boost threshold speed or an engine speed which is slightly above the boost threshold speed, and the drive engine is then loaded up to substantially the full load torque with a substantially constant engine speed before the slipping operation of the clutch ends.

20 Claims, 2 Drawing Sheets

(51) Int. Cl.
*G06F 19/00* (2011.01)
*F02D 41/00* (2006.01)
*B60W 10/02* (2006.01)
*B60W 10/06* (2006.01)
*B60W 30/188* (2012.01)
*B60W 50/06* (2006.01)
*F02D 41/02* (2006.01)

(52) U.S. Cl.
CPC ........... *B60W30/1882* (2013.01); *B60W 50/06* (2013.01); *B60W 30/1884* (2013.01); *B60W 2510/0638* (2013.01); *B60W 2510/0657* (2013.01); *B60W 2530/16* (2013.01); *B60W 2540/10* (2013.01); *B60W 2710/027* (2013.01); *B60W 2710/0644* (2013.01); *B60Y 2400/435* (2013.01); *F02D 41/022* (2013.01); *F02D 2250/21* (2013.01); *Y02T 10/144* (2013.01)

(56) References Cited

U.S. PATENT DOCUMENTS

| | | | |
|---|---|---|---|
| 6,846,269 | B2 | 1/2005 | Reuschel et al. |
| 6,953,410 | B2 | 10/2005 | Wheeler et al. |
| 7,220,215 | B2 | 5/2007 | Eriksson et al. |
| 8,070,653 | B2 | 12/2011 | Swank et al. |
| 2005/0153815 | A1* | 7/2005 | Janssen ............................ 477/62 |
| 2006/0161325 | A1* | 7/2006 | Jiang ............................ 701/54 |
| 2007/0142165 | A1 | 6/2007 | Klinkner et al. |
| 2007/0243971 | A1* | 10/2007 | Brevick ............................ 477/70 |
| 2008/0039280 | A1* | 2/2008 | Petzold et al. .................. 477/70 |
| 2008/0312038 | A1* | 12/2008 | Nakagawa et al. ........... 477/175 |
| 2010/0185370 | A1 | 7/2010 | Wurthner et al. |
| 2011/0237393 | A1 | 9/2011 | Mair |

FOREIGN PATENT DOCUMENTS

| | | | |
|---|---|---|---|
| DE | 102 34 428 | A1 | 2/2004 |
| DE | 103 30 951 | A1 | 1/2005 |
| DE | 10330951 | A1 * | 1/2005 |
| DE | 103 35 259 | A1 | 2/2005 |
| DE | 60207737 | T2 | 8/2006 |
| DE | 102006056742 | A1 | 6/2007 |
| DE | 10 2006 027 865 | A1 | 12/2007 |
| DE | 10 2007 019 729 | A1 | 10/2008 |
| DE | 10 2007 031 725 | A1 | 1/2009 |
| DE | 102008003899 | A1 | 7/2009 |
| DE | 10 2008 054 802 | A1 | 6/2010 |
| EP | 1 070 625 | A2 | 1/2001 |
| EP | 1 354 751 | A2 | 10/2003 |

OTHER PUBLICATIONS

German Search Report Corresponding to DE 10 2010 028 282.0.
International Search Report Corresponding to PCT/EP2011/053109.
International Search Report Corresponding to PCT/EP2011/053113.
International Search Report Corresponding to PCT/EP2011/053112.
International Search Report Corresponding to PCT/EP2011/053114.
Written Opinion Corresponding to PCT/EP2011/053109.
Written Opinion Corresponding to PCT/EP2011/053113.
Written Opinion Corresponding to PCT/EP2011/053112.
Written Opinion Corresponding to PCT/EP2011/053114.

* cited by examiner

METHOD FOR CONTROLLING THE LOCOMOTION OF A MOTOR VEHICLE

This application is a National Stage completion of PCT/EP2011/053113 filed Mar. 2, 2011, which claims priority from German patent application serial no. 10 2010 028 071.2 filed Apr. 22, 2010.

FIELD OF THE INVENTION

The invention relates to a method for the drive control of a motor vehicle, the drive train of which comprises a drive engine which is built as a turbo-charged internal combustion engine, a startup and shift clutch built as an automated friction clutch, and a gearbox built as an automatic stepped transmission, wherein a torque deficiency of the drive engine occurring during travel is overcome; this torque deficiency occurs when the driver demands power corresponding to a target torque of the drive engine which is above the spontaneously attainable maximum torque.

BACKGROUND OF THE INVENTION

In motor vehicles, there has been increasing use of automatic stepped transmissions having at least one automated friction clutch as a startup and shifting clutch, in which the gear selection, the triggering of shift operations, the engaging and disengaging of gear steps, and the engaging and disengaging of the friction clutch are automated; that is, these actions occur by evaluating operating parameters in a transmission control device and the drive assigned to the control.

Particularly in the case of commercial vehicles, the drive engines are usually designed as diesel engines that can be boosted by a turbo-charger and that have a specific load build-up characteristic. As described in more detail in the document DE 10 2008 054 802.2, which was previously unpublished and which discloses a method for controlling an automatic stepped transmission depending on the dynamic operating characteristics of a turbo-charged internal combustion engine, a turbo-charged internal combustion engine can spontaneously, that is with high torque gradients, only reach an intake torque lying below the full load torque. A further increase of the engine torque is briefly possible, although with low torque gradients, only above a boost threshold speed, above which the turbo-charger creates a significant increase of the charge pressure and thus the engine torque. Thus aside from the idle speed, cut-off speed and the full load torque characteristic curve, the dynamic behavior of a turbo-charged internal combustion engine is also determined by the boost threshold speed and the intake torque characteristic curve as well as by the torque gradients present in certain ranges. Due to the limitation of the spontaneously achievable engine torque to the intake torque, with turbo-charged internal combustion engines, significant torque deficiency, generally referred to as turbo lag, is observed below the boost threshold speed when the power that is requested by the driver by deflecting the gas pedal requires engine torque that is greater than the intake torque.

To avoid or at least mitigate the undesired turbo lag, multiple technical solutions were disclosed such as an adjustable turbine geometry for improving the response behavior of the exhaust gas turbo-charger, or auxiliary devices for increasing the charge pressure at low engine speed, for instance a mechanically drivable compressor, an electrically drivable supplemental compressor, or a mechanical or electrical drive of the drive shaft of the exhaust gas turbo-charger. However, such devices are relatively complex and expensive, increase the construction space requirements and represent increased failure potential for the operation of the internal combustion engine, so they are frequently omitted.

Particularly in the case of a loaded commercial vehicle traveling uphill, which is typically performed at high engine load, that is, at an engine torque lying above the intake torque, a travel situation can occur with torque deficiency of the drive engine, for example when the driver briefly releases the gas pedal or significantly reduces the gas pedal setting to avoid a collision with a slower vehicle traveling in front for example. If the gas pedal setting and thus the power demanded by the driver is then significantly increased again, for example because slower vehicle traveling in front has turned off or can be overtaken, the charge pressure and the engine speed of the drive engine can have been reduced so far that the drive engine can no longer spontaneously attain the previously set high engine torque, however the briefly attainable maximum intake torque is not sufficient for overcoming the drive resistance.

The torque deficiency of the drive engine in this travel situation can be remedied either by shifting into a lower gear, or by startup from a standstill or from a slow rolling speed. For downshifting, a lower gear must be available however, which particularly in the case of a lighter weight commercial vehicle is frequently not the case due to a low number of gears of the respective stepped transmission. In addition the drive resistance (rolling resistance+incline resistance) must not be too high, because otherwise the motor vehicle is decelerated too greatly during the shift-dependent interruption of tractive force, and then startup from standstill is necessary in any case. However, startup from standstill is associated with a loss of comfort and with high thermal and mechanical loading of the friction clutch, and under certain circumstances, such as travel on difficult terrain, may no longer be possible.

A further driving situation with torque deficiency of the drive engine can arise during travel with low engine load and low engine speed, when the driver wishes to accelerate but the spontaneously attainable intake torque of the drive engine is not sufficient for this purpose, that is, no acceleration is possible (intake torque=drive resistance torque) or only very small acceleration (very low excess torque compared to the intake torque available for acceleration) is possible. The torque deficiency of the drive engine can be remedied in this driving situation too by downshifting, but at the cost of the aforementioned risks and disadvantages.

Many suitable methods have already been proposed for overcoming torque deficiency of a turbo-charged internal combustion engine occurring in other operating situations of a motor vehicle. Thus for example, the document DE 102 34 428 A1 discloses an appropriate method for the startup control of a motor vehicle, the drive train of which comprises a drive engine built as a turbo-charged internal combustion engine, a startup element built as a hydrodynamic torque converter and a transmission built as a planetary automatic transmission. This known method provides that during a startup procedure a load carrying friction shift element (clutch or brake) of the automatic transmission is operated with slip for a brief period of time such that the internal combustion engine can build-up increased startup torque using an increased engine speed.

The document U.S. Pat. No. 6,692,406 B2 describes a corresponding method for the gearshift control of a motor vehicle, the drive train of which comprises a drive engine designed as a turbo-charged internal combustion engine, a startup and shifting clutch designed as an automated friction clutch, and a transmission designed as an automatic stepped transmission. This known method provides that with an upshift at full load, the internal combustion engine is controlled such that the charge pressure is maintained during the shifting procedure either by increasing the exhaust energy or by maintaining the rotational speed of the exhaust gas turbocharger, and thus sufficiently high engine torque can be built up at the end of the shifting procedure.

Due to different operating situations and other technical conditions, the two named methods cannot however be readily applied to the present stated problem.

SUMMARY OF THE INVENTION

Therefore, the problem addressed by the present invention is to propose a method for the drive control of a motor vehicle of the initially named type with which torque deficiency of the drive engine occurring during travel can be overcome without performing a downshift or startup from standstill.

This problem is solved according to the invention, in that initially the friction clutch is disengaged up to the transition into slipping operation, specifically until the drive engine has accelerated up to the boost threshold speed $n_{L\_min}$ or an engine speed $n_M$ lying slightly above the boost threshold speed $n_{L\_min}$, thus $n_M = n_{L\_min}$; $n_M = n_{L\_min} + \Delta n_M$, and that the drive engine is then loaded at a largely constant engine speed $n_M \approx n_{Lmin}$ up to nearly the full load torque $M_{VL}(n_{L\_min})$ before the slipping operation of the friction clutch ends.

Accordingly, the invention assumes a known motor vehicle, particularly a commercial vehicle, the drive train of which comprises a drive engine built as a turbo-charged internal combustion engine, a startup element built as an automated friction clutch and a transmission built as an automatic stepped transmission. In such a motor vehicle, torque deficiency of the drive engine can occur during travel, which expresses itself in that the power requested by the driver given by the gas pedal setting corresponds to a target torque $M_{soll}$ of the drive engine that the drive engine cannot attain spontaneously, that is, that lies above the spontaneously attainable maximum torque $M_{max}$ of the drive engine.

To overcome this torque deficiency of the drive engine without downshifting and without a startup from standstill, the method according to the invention provides that the friction clutch is disengaged up to the occurrence of the slipping operation so that the drive engine is accelerated at least up to the boost threshold speed $n_{L\_min}$, above which the exhaust gas turbo-charger can build-up higher charge pressure and thus the drive engine can build up higher engine torque $M_M$.

A possible speed increase $\Delta n_M$ of approximately 50 min$^{-1}$ to 100 min$^{-1}$ above the boost threshold speed $n_{L\_Min}$ serves as a control reserve to compensate for signal inaccuracies and disruptions, by means of which a decrease of the engine speed $n_M$ to below the boost threshold speed $n_{L\ min}$ and a consequently caused reduction of the engine toque $M_M$ to the intake torque $M_S$ can be avoided.

Subsequently, according to the method according to the invention, the engine torque $M_M$ is increased up to the full load torque $M_{VL}(n_{L\_min})$ by a coordinated engagement of the friction clutch and by increasing the engine power of the drive engine at a largely constant engine speed $(n_M \approx n_{L\_min})$ before the slipping operation of the friction clutch ends.

Thus, depending on the dynamic operating characteristics of the drive engine, higher engine torque $(M_M = M_{VL}(n_{L\_min})$ is made available with which torque deficiency of the drive engine is overcome, and which is sufficient in most operating situations to continue travel without a downshift or a startup from standstill.

The data which represents the dynamic operating characteristics of the internal combustion engine can be taken either directly from the engine control unit or from a data store of the transmission control unit. As already described in the document DE 10 2008 054 802.2, the relevant data that corresponds to the vehicle configuration can be transferred to the data store of the transmission control unit at the end of the production line of the motor vehicle, and during later travel operation can be adapted through comparison with the current operating data, particularly of the drive engine, that is, adapted to the changed operating characteristics. By accessing such updated data, the present method for drive control is automatically adapted to changed operating characteristics of the motor vehicle or of the drive engine.

With respect to ending the slipping operation of the friction clutch, there are basically three possible variants that differ from each other with respect to driving comfort, the thermal loading of the friction clutch and the ultimately attainable engine torque $M_M$.

According to a first variant of the method, the engine speed $n_M$ is lowered to the transmission input speed $n_{GE}$ by further engagement of the friction clutch and/or by intervention in the engine control, thus $(n_M = n_{GE}, n_M < n_{L\_min})$, and then the friction clutch is completely engaged. This variant of the method, which is preferably used when the present engine torque $M_M(n_{L\_min})$ lies significantly above the target torque $M_{soll}$ of the drive engine $(M_M(n_{L\_min}) >> M_{soll})$, leads to very low thermal loading of the friction clutch due to the shortened slipping operation, although it is associated with an abrupt transition into the normal driving operation (with an engaged friction clutch) which is considered uncomfortable.

In a second variant of the method, which is preferably used when the present engine torque $M_M(n_{L\_min})$ largely corresponds to the target torque $M_{soll}$ of the drive engine or lies slightly above the target torque $(M_M(n_{L\_min}) \geq M_{soll})$, it is provided in contrast that the drive engine is held at the present engine speed $(n_M = n_{Lmin})$ and the friction clutch is held at the present degree of disengagement until the input side and the output side of the friction clutch run synchronously $(n_M = n_{GE})$, and then the friction clutch is completely engaged. Due to the engine speed being held constant $(n_M = n_{L_{13}\ min})$, this variant of the method results in a largely smooth and therefore comfortable transition to the normal driving operation. However it results in a prolonged slipping phase, which leads to increased thermal loading of the friction clutch.

In a third variant of the method, the drive engine is set to a higher engine speed $(n_M > n_{L\_min})$ and a higher engine torque $(M_M > M_{VL}(n_{L\_min}))$ by an increase in the engine power and a further engagement of the friction clutch, and held there until the input side and the output side of friction clutch run synchronously $(n_M = n_{GE})$, and then the friction clutch is engaged completely. This variant of the method is used preferably when the present engine torque $M_M(n_{L\_min})$ lies significantly below the target torque $M_{soll}$ of the drive engine, thus $(M_M(n_{L\_min}) << M_{soll})$. This variant of the method also results in a largely smooth and comfortable transition to the normal drive operation, but also has a further prolonged slipping phase with increased thermal loading of the friction clutch.

Various criteria can be evaluated alone or in combination with each other in order to detect an existing or immediately impending torque deficiency of the drive engine, and thus in order to trigger the method according to the invention.

Thus, an existing or immediately impending torque deficiency of the drive engine can be detected in that the present engine torque $M_M$ is less than or equal to the intake torque $M_S$ of the drive engine ($M_M \leq M_S$), in that the present engine speed $n_M$ is less than the boost threshold speed $n_{L\_min}$ of the drive engine ($n_M<n_{L\_min}$), and in that the target torque $M_{soll}$ of the drive engine lies above the intake torque $M_S$ of the drive engine ($M_{soll}>M_S$).

Likewise an existing or immediately impending torque deficiency of the drive engine can be detected in that the present drive resistance torque $M_{FW}$ is greater than the spontaneously available maximum torque $M_{max}$ of the drive engine, ($M_{FW}>M_{max}$), and in that the target torque $M_{soll}$ of the drive engine lies above the present drive resistance torque, $M_{FW}$ ($M_{soll}>M_{FW}$).

Also, an existing or immediately impending torque deficiency of the drive engine can be detected in that the present charge pressure $p_L$ of the drive engine is less than a boost threshold value $p_{L\_min}$ characterizing the charge pressure build-up by the exhaust gas turbo-charger ($p_L<p_{L\_min}$), and in that the drive engine, to create the target torque $M_{soll}$), requires a charge pressure ($p_L \geq p_{L\_min}$) lying above the boost threshold value $p_{L\_min}$, thus ($M_{soll} \leq M_S$).

In addition, it is reasonable to make performing the method dependent on certain vehicle-specific, environment-specific and use-specific criteria.

Thus it is expedient to determine ahead of time the engine torque $M_{VL}(n_M)$ that can be attained using the drive control according to the invention, and then to perform the drive control, according to the invention, only when the attainable engine torque $M_{VL}(n_M)$ corresponds at least to the present drive resistance torque $M_{FW}$, thus ($M_{VL}(n_M) \geq M_{FW}$). If the engine torque $M_{VL}(n_M)$ that can be attained using the method lies below the drive resistance [torque] $M_{FW}$, thus ($M_{VL}(n_M)<M_{FW}$), this would lead to a deceleration of the motor vehicle such that in this case a downshift or a startup from standstill is unavoidable, and therefore performing the drive control according to the invention does not make any sense.

With this procedure, the engine torque $M_M(n_M)$ that can be attained using the drive control according to the invention can be determined for this purpose from the full load characteristic curve of the drive engine in a simplified manner as the full load torque $M_{VL}(n_M)$ that can be set at the current engine speed $n_M$.

In particular with the two last named variants of the method, the thermal load of the friction clutch is relatively high due to the long slipping phase and can therefore exceed the permissible load limits. Therefore it is expedient to determine ahead of time the thermal loading of the friction clutch caused by the drive control according to the invention, and to perform the drive control according to the invention only when the thermal loading of the friction clutch does not exceed a specified load limit value.

Also the activation or non-activation of the drive control according to the invention can be made dependent on the presently engaged gear.

Thus, it can be provided that the drive control according to the invention is performed only when the currently engaged gear does not exceed a maximum gear determined ahead of time. Limiting the use of the method according to the invention by a maximum gear can serve to limit the loading of the friction clutch for example.

A gear-specific criterion can, however, also exist in that the drive control according to the invention is performed only when no lower gear is available for a downshift. This is the case when the presently engaged gear is already the lowest gear (first gear) of the stepped transmission, or when it is not possible to shift into a lower gear due to a malfunction. In this case, the method according to the invention forms an emergency method for the case that a downshift is not possible.

A further gear-specific criterion can exist in that the drive control according to the invention is performed only when the presently engaged gear corresponds to the startup gear provided under the current operating and environmental conditions, which are determined essentially by the vehicle mass, the roadway incline and the roadway properties. In this case too, the method according to the invention forms an emergency method with which a startup from standstill, which is undesirable with respect to drive comfort and clutch wear, is avoided.

Also it can be provided that the drive control according to the invention is performed only when a downshift would lead to a vehicle standstill and a subsequent startup under the present operating and environmental conditions, that is, due to a high rolling resistance and incline resistance. In this case the method according to the invention also forms an emergency method with which a startup can be avoided under difficult conditions, such as on difficult terrain and thus a possible breakdown of the motor vehicle can be avoided.

A further criterion for activating the method according to the invention can be that the drive control according to the invention is performed only when the gas pedal setting has attained or exceeded a predetermined limit setting. This limit setting of the gas pedal can for instance be the kick-down setting with which a downshift is typically triggered. With this criterion it is guaranteed that the drive control according to the invention is activated only upon high power requests by the driver.

Finally, it can be provided that the drive control according to the invention is performed only when it is released or activated as a vehicle-specific or use-specific special function. Thus, it is possible for example that the drive control according to the invention is available or released only for specific emergency vehicles, such as fire trucks, ambulances, and military vehicles, or can be enabled only for specific uses, such as off-road travel, but is not available or is blocked during normal drive operation in standard vehicles.

BRIEF DESCRIPTION OF THE DRAWINGS

For illustrating the invention, the description is accompanied by a drawing with an example embodiment. The figures show.

DETAILED DESCRIPTION OF THE PREFERRED EMBODIMENTS

A presently assumed drive train of a commercial vehicle comprises a drive engine designed as a turbo-charged internal combustion engine, a startup and shifting clutch designed as an automated friction clutch, and a transmission designed as an automatic stepped transmission.

The stepped transmission can be connected on the input side, via the friction clutch, to the drive shaft (crankshaft) of the internal combustion engine, and is connected on the output side, via a cardan shaft, to the axle transmission (axle differential) of a drive axle. At least one auxiliary consumer and optionally at least one drive-side power take-off are disposed at the internal combustion engine, which, in the driven state, reduce the engine torque $M_M$ from the internal combustion engine that can be delivered at the friction clutch and that is available for driving the motor vehicle. In addition, further output drive-side power take-offs can be disposed at the stepped transmission or at the axle transmission, which, in the activated state, further reduce the engine torque $M_M$ transmitted, via the friction clutch, to the stepped transmission, such that in driving operation a correspondingly reduced torque is available for overcoming the drive resistance and attaining at least minimal vehicle acceleration.

In drive operation, the internal combustion engine must therefore be able to generate engine torque $M_M$ and deliver the torque at the friction clutch so that such torque, minus the drive torques for the auxiliary consumers and the drive-side power take-offs, is sufficient for attaining acceptable vehicle acceleration. For this purpose, the engine torque $M_M$ transferred by the friction clutch must be high enough that, even minus the drive torques for the output-drive-side power take-offs, the engine torque exceeds the drive resistance torque resulting from the present drive resistance, that is, the reduced drive resistance torque $M_{FW}$ reduced with the overall transmission ratio and the efficiency of the drive train at the input shaft of the stepped transmission, to such a degree that the excess torque is at least sufficient for minimal vehicle acceleration.

The present invention proposes a method with which torque deficiency of the drive engine during travel is overcome, this torque deficiency occurring when the driver demands power corresponding to a target torque $M_{soll}$ of the drive engine which is above the spontaneously attainable maximum torque $M_{max}$, without a downshift or a startup from standstill having to be performed.

Figure 3:
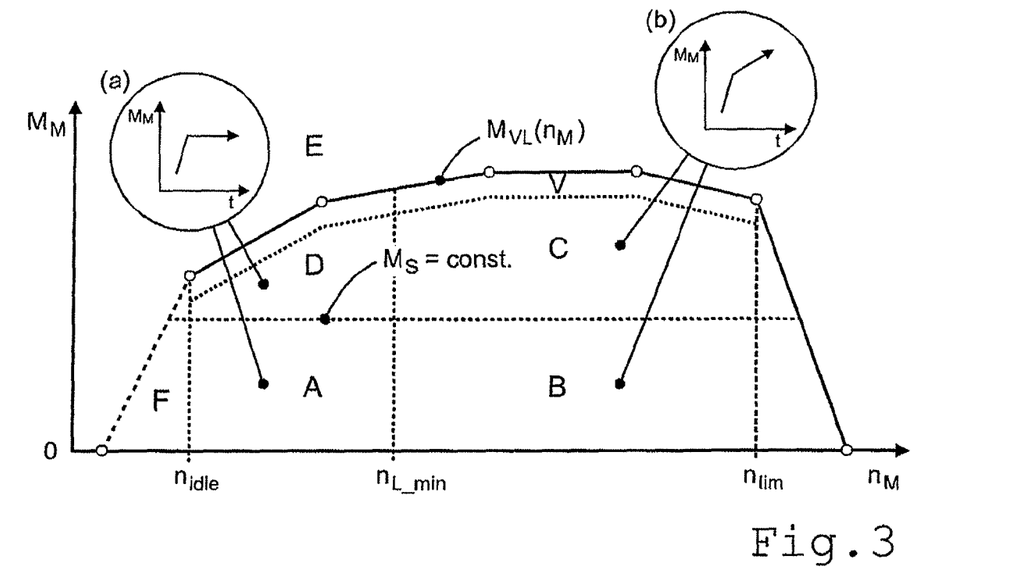

For this purpose, the important dynamic operating characteristics of the drive engine built as a turbo-charged internal combustion engine, can be taken from the engine dynamics characteristic map known from the document DE 10 2008 054 802.2, which can be stored in the data store of the transmission control unit and is shown for example in FIG. 3.

The engine dynamics characteristic map, shown in FIG. 3 in a torque—speed diagram, contains the spontaneously available maximum torque $M_{max}$ of the internal combustion engine and the maximum torque gradient $(dM_M/dt)_{max}$, with which the spontaneously available maximum torque $M_{max}$ of the internal combustion engine can be attained as quickly as possible, in each case as a function of the present engine torque $M_M$ and the present engine speed $n_M$, thus $(M_{max}=f(M_M, n_M), (dM_M/dt)_{max}=f(M_M, n_M))$.

The engine dynamics characteristic map is bounded by the steady-state full load torque characteristic curve $M_{VL}(n_M)$, the zero torque curve $(M_M=0)$, the idle speed $n_{idle}$ and the cut-off speed $n_{lim}$ of the internal combustion engine. The engine dynamics characteristic map is subdivided into four operating regions A, B, C, D by the intake torque characteristic curve $M_S(n_M)$ of the intake torque, simplified here as assumed to be constant $M_S$=const., and the boost threshold speed $n_{L\_min}$ of the internal combustion engine.

In the first operating region A ($0 \leq M_M < M_S$, $n_{idle} \leq n_M < n_{L\_min}$) that is below the intake torque characteristic curve $M_S$=const. and below the boost threshold speed $n_{L\_min}$, the spontaneously available maximum torque $M_{max}(n_M)$ of the internal combustion engine is formed in each case by the corresponding value of the intake torque $M_S$, thus $(M_{max}(n_M)=M_S)$. However, as the intake torque $M_S$ in this region is constant ($M_S$=const.), the spontaneously available maximum torque $M_{max}$ of the internal combustion engine is represented by a single value ($M_{max}=M_S$=const.). Independent of this, the very high maximum torque gradient $(dM_M/dt)_{max}$ in operating region A can also be represented by a single value.

In the second operating region B ($0 \leq M_M < M_S$, $n_{L\_min} \leq n_M \leq n_{lim}$) lying below the intake torque characteristic curve $M_S$=const. and above the boost threshold speed $n_{L\_min}$, the spontaneously available maximum torque $M_{max}(n_M)$ of the internal combustion engine is similarly given in each case by the corresponding value of the intake torque $M_S$. Because the intake torque $M_S$ in this region has a constant progression ($M_S$=const.), the spontaneously available maximum torque $M_{max}$ of the internal combustion engine in operating region B is likewise represented by a single value ($M_{max}=M_S$=const.). As with operating region A, the very high maximum torque gradient $(dM_M/dt)_{max}$ beneath the intake torque characteristic curve $M_S$=const. can also be expressed by a single value in operating region B.

In the third operating region C ($M_S \leq M_M < M_{VL}(n_M)$, $n_{L\_min} \leq n_M \leq n_{lim}$), adjacent to operating region B and lying above the intake torque characteristic curve $M_S$=const. and above the boost threshold speed $n_{L\_min}$, a further increase of the engine torque $M_M$ is possible up to the respective value of the steady-state full load torque characteristic curve $M_{VL}(n_M)$, however, with a significantly lower maximum torque gradient $(dM_M/dt)_{max}$ than in operating regions A and B, i.e., below the intake torque characteristic curve $M_S$=const.

In the fourth operating region D ($M_S \leq M_M < M_{VL}(n_M)$, $n_{idle} \leq n_M < n_{L\_min}$), adjoining at the first region A, above the intake torque characteristic curve $M_S$=const. and below the boost threshold speed $n_{L\_min}$, a further rapid increase of the engine torque $M_M$ is not possible without an increase of the engine speed $n_M$ above the boost threshold speed $n_{L\_min}$. Consequently, in operating region D, the spontaneously available maximum torque $M_{max}(n_M)$ of the internal combustion engine equals the corresponding value of the intake torque $M_S$, thus $(M_{max}(n_M)=M_S$=const.) and the maximum torque gradient $(dM_M/dt)_{max}$ equals zero, thus $((dM_M/dt)_{max}=0)$.

An operating region E, which cannot be attained in normal driving operation and thus is not relevant, can be defined above the full load torque characteristic curve $M_{VL}(n_M)$. Below the full load torque characteristic curve $M_{VL}(n_M)$ and the idle speed $n_{idle}$, there is an undesirable but technically attainable operating region F, into which the internal combustion engine can be pushed dynamically in regard to its operating behavior from an engine speed $n_M$ lying near the idle speed $n_{idle}$, for example due to a rapid engagement of the friction clutch, and in which there is a danger of stalling the internal combustion engine.

In addition, a nearby region lying immediately below the full load torque characteristic curve $M_{VL}(n_M)$ can be defined as an additional operating region V, in which the internal combustion engine under full load, that is along the full load torque characteristic curve $M_{VL}(n_M)$, can be pushed to a lower engine speed $n_M$ or controlled to higher engine speed $n_M$.

Figure 4A:
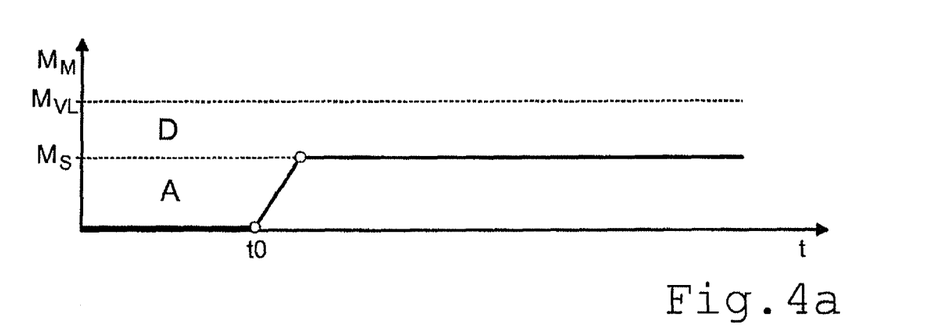

For the driving states considered here, in which the drive engine is to be guided from an engine speed $n_M$ lying below the boost threshold speed $n_{L\_min}$ to an engine speed $n_M$ lying above the boost threshold speed $n_{L\_min}$, and from an engine torque $M_M$ lying below the intake torque $M_S$ to an engine torque $M_M$ lying above the intake torque $M_S$, it is to be noted accordingly that the drive engine can be spontaneously loaded, that is with a high torque gradient $dM_M/dt$, only up to the intake torque $M_S$ when the engine speed $n_M$ remains below the boost threshold speed $n_{L\_min}$. This relationship is illustrated in a greatly simplified manner in the torque progression $M_M(t)$ in image insert (a) of FIG. 3 and in the time progression of FIG. 4a.

Figure 4B:
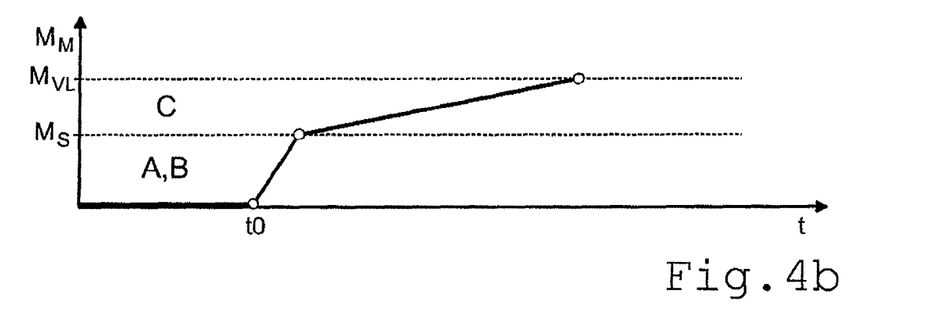

Likewise it is to be noted for the present drive control that the drive engine must be accelerated above the boost threshold speed $n_{L\_min}$ in order to spontaneously set an engine torque $M_M$ lying above the intake torque $M_S$, that is, it must be controlled from operating region A into operating region B or C, because a further rapid increase of the engine torque $M_M$ is possible only above the boost threshold speed $n_{L\_min}$, even with a lower torque gradient $dM_M/dt$. This relationship is illustrated in a greatly simplified manner in the torque progression $M_M(t)$ in image insert (b) of FIG. 3 and in the time progression of FIG. 4b.

The present method for drive control according to the invention provides that remedying a torque deficiency of the drive engine depending on the dynamic operating properties thereof occurs such that initially the friction clutch is disengaged up to the transition into slipping operation until the drive engine has accelerated up to the boost threshold speed $n_{L\_min}$ or an engine speed $n_M$ lying slightly above the boost threshold speed $n_{L\_min}$, thus ($n_M=n_{L\_min}$; $n_M=n_{L\_min}+\Delta n_M$). Next, the drive engine is then loaded up to nearly the full load torque $M_{VL}(n_{L\_min})$ with a largely constant engine speed ($n_M \approx n_{L\_min}$) by an appropriate increase of the engine power and by an engagement of the friction clutch coordinated therewith before the slipping operation of the friction clutch ends.

Figure 1:
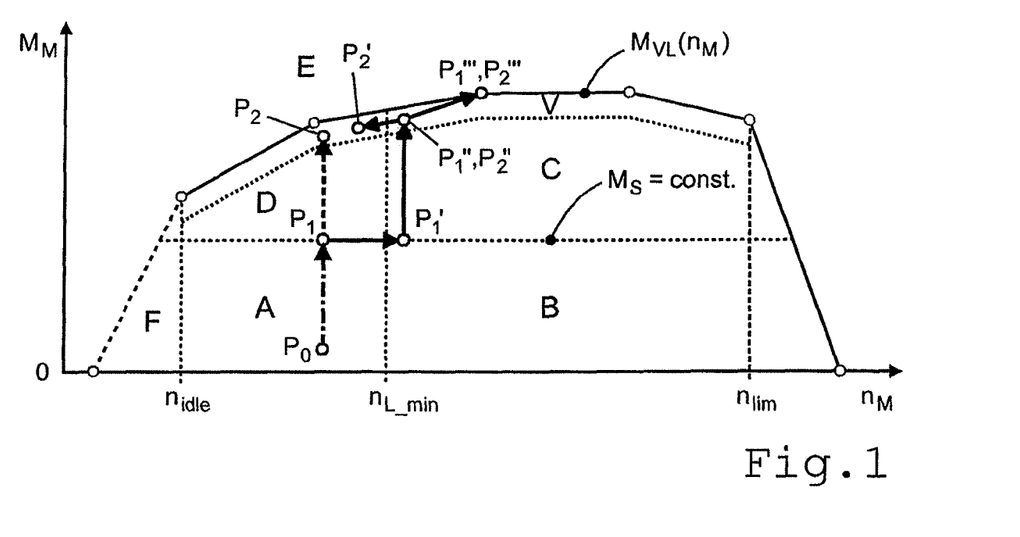
FIG. 1 a correction according to the invention of torque deficiency of a turbo-charged internal combustion engine occurring during travel in an engine characteristic map, FIG. 2 relevant speed and torque progression for the example in FIG. 1, FIG. 3 an engine dynamics characteristic map of a turbo-charged internal combustion engine, FIG. 4*a* the torque build-up of an internal combustion engine according to FIG. 4 with an engine speed controlled below the boost threshold speed, thus ($n_M \leq n_{L\_min}$), and FIG. 4*b* the torque build-up of an internal combustion engine according to FIG. 4 with an engine speed controlled above the boost threshold speed, thus ($n_M>n_{L\_min}$).
Figure 2:
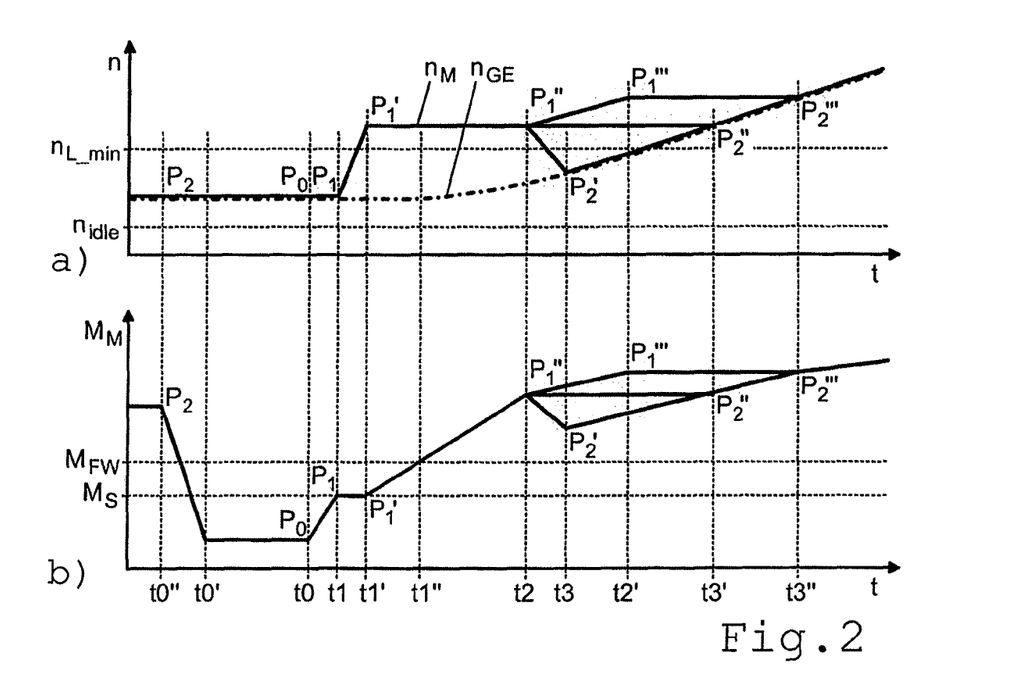

Three variants of a corresponding speed and torque guidance of the internal combustion engine are shown in FIG. 1 in an engine dynamics characteristic map according to FIG. 3 and in FIGS. 2a) and b) with the respective time progressions of the engine speed $n_M$, the transmission input speed $n_{GE}$ and the engine torque $M_M$.

Starting from a drive operating state with high engine torque $M_M$ and relatively low engine speed $n_M$ at the time t0" (operating point $P_2$), the power requested by the driver is reduced significantly by reducing the gas pedal setting or by releasing the gas pedal such that the engine torque $M_M$ at a largely constant engine speed $n_M$ decreases below the intake torque $M_S$ up to time t0' (operating point $P_0$).

When the driver again shortly thereafter (at time t0) requests power at the old level or beyond that by an appropriate gas pedal setting, the drive engine can quickly increase the engine torque $M_M$, that is, at high torque gradient $dM_M/dt$, due to the dynamic operating properties thereof, only up to the intake torque $M_S$ (operating point $P_1$, time t1).

An increase of the engine torque $M_M$ to the previous level at operating point $P_2$, shown in FIG. 1 with a dashed line, is then not possible, such that normally a downshift associated with an interruption of the tractive force or even startup from standstill would be required. At the latest in this operation situation, the method according to the invention is activated in order to overcome the torque deficiency of the drive engine without performing a downshift or a startup from standstill.

For this purpose, initially the friction clutch at time t1 is disengaged up to the transition into the slipping operation, whereby the drive engine is accelerated until exceeding the boost threshold speed $n_{L\_min}$, (operating point $P_1'$, time t1'). Then, the drive engine is loaded by a corresponding increase of the engine power at a largely constant engine speed ($n_M \approx n_{L\_min}$) up to nearly full load torque $M_{VL}(n_{L\_min})$ and by a coordinated engagement of the friction clutch (operating point $P_1''$, time t2), whereby in the meantime the engine torque $M_M$ at time t1" exceeds the drive resistance torque $M_{FW}$, and consequently the motor vehicle and the input shaft of the stepped transmission are accelerated, that is, the transmission input speed $n_{GE}$ increases.

With the attainment of operating point $P_1''$ near to the full load torque $M_{VL}(n_{L\_min})$, three possibilities arise for ending the slipping operation of the fiction clutch and transitioning into normal driving operation.

In a relatively uncomfortable first variant of the method, however with low thermal loading of the friction clutch, the engine speed $n_M$ is reduced to the transmission input speed $n_{GE}$ by further engagement of the friction clutch and/or by intervention in the engine control, ($n_M=n_{GE}$, $n_M<n_{Lmin}$ whereby the engine torque $M_M$ is reduced, thus ($M_M<M_{VL}(n_{L\_min})$) and the engine speed $n_M$ is reduced below the boost threshold speed $n_{L\_min}$, thus ($n_M<n_{L\_min}$) (operating point $P_2'$, time t3). Then the friction clutch is completely engaged and transitioned into normal driving operation control.

In a comfortable second variant of the method, however with higher thermal loading of the friction clutch, the drive engine is held at the present engine speed ($n_M=n_{L\_min}$) and the friction clutch is held at the present degree of disengagement until synchronous running ($n_M=n_{GE}$) is achieved at the friction clutch, and thereupon the friction clutch is completely engaged (operating point $P_2''$, time t3').

In an also comfortable third variant of the method, however with even higher thermal loading of the friction clutch, the drive engine is set to a higher engine speed ($n_M>n_{L\_min}$) and a higher engine torque ($M_M>M_{VL}(n_{L\_min})$) by increasing the engine power and by further engagement of the friction clutch (operating point $P_1'''$, time t2') and held there until synchronous running ($n_M=n_{GE}$) has been achieved at the friction clutch (operating point $P_2'-$, time t3"),after which the friction clutch is completely engaged.

The variant of the method used can be fixed in a vehicle-specific or use-specific manner, or selected depending on present operating parameters, particularly in the relation of the engine torque ($M_M=M_{VL}(n_{L\_min})$) present at operating point $P_1''$ to the target torque $M_{soll}$, requested by the driver.

REFERENCE CHARACTERS

A operating region
B operating region
C operating region
D operating region
E operating region
F operating region
M torque
$M_{FW}$ drive resistance torque
$M_M$ engine torque
$M_{max}$ maximum torque
$M_S$ intake torque
$M_{soll}$ target torque
$M_{VL}$ full load torque
n rotational speed
$n_{GE}$ transmission input speed
$n_{idle}$ idle speed
$n_{L\_min}$ boost threshold speed
$n_{lim}$ cut-off speed
$n_M$ engine speed
p pressure
$p_L$ charge pressure
$P_{L\_min}$ boost threshold value
$P_0$ operating point
$P_1$ operating point
$P_1'$ operating point
$P_1''$ operating point
$P_1'''$ operating point P$_2$ operating point
P$_2$' operating point
P$_2$'' operating point
P$_2$''' operating point
t time
t0 point in time
t0' point in time
t0'' point in time
t1 point in time
t1' point in time
t1'' point in time
t2 point in time
t2' point in time
t3 point in time
t3' point in time
t3'' point in time
V operating region
$\Delta n_M$ increase in speed

The invention claimed is:

1. A method for drive control of a motor vehicle having a drive train which comprises a turbo-charged internal combustion engine, an automated friction clutch which functions as a startup and shifting clutch, and an automatic stepped transmission, to overcome a torque deficiency of the turbo-charged internal combustion engine that occurs when a driver demands power corresponding to a target torque ($M_{soll}$) of the turbo-charged internal combustion engine which is greater than a spontaneously attainable maximum torque ($M_{max}$), the method comprising the steps of:
   initiating the drive control, with either an engine control unit or transmission control unit, when the target torque of the turbo-charged internal combustion engine demanded by the driver, via a gas pedal, is greater than the spontaneously attainable maximum torque,
   initially disengaging the friction clutch up to a slipping operation,
   accelerating the turbo-charged internal combustion engine to either a boost threshold speed ($n_{L\_min}$) or an engine speed ($n_M$) which is above the boost threshold speed (($n_{L\_min}$), ($n_M = n_{L\_min}$; $n_M = n_{L\_min} + \Delta n_M$)),
   increasing a load on the turbo-charged internal combustion engine up to a substantially full load torque ($M_{VL}(n_{L\_min})$) by engaging the friction clutch and increasing engine power at a substantially constant engine speed ($n_M \approx n_{L\_min}$) before the slipping operation of the friction clutch ends, and
   fully engaging the friction clutch to end slipping operation thereof.

2. The method according to claim 1, further comprising the steps of lowering the engine speed ($n_M$) to a transmission input speed (($n_{GE}$), ($n_M = n_{GE}$, $n_M < n_{L\_min}$)), by at least one of further engagement of the friction clutch and intervention in the engine control, and then completely engaging the friction clutch.

3. The method according to claim 2, further comprising the step of performing the method when a present engine torque ($M_M(n_{L\_min})$) is greater than the target torque ($M_{soll}$) of the turbo-charged internal combustion engine ($M_M(n_{L\_min}) >> M_{soll}$).

4. The method according to claim 1, further comprising the step of holding the turbo-charged internal combustion engine at a present engine speed ($n_M = n_{L\_min}$) and holding the friction clutch at a present degree of disengagement until reaching synchronous running($n_M = n_{GE}$) at the friction clutch, and then completely engaging the friction clutch.

5. The method according to claim 4, further comprising the step of performing the method when a present engine torque ($M_M(n_{L\_min})$) either substantially corresponds to the target torque ($M_{soll}$) of the turbo-charged internal combustion engine, or is greater than the target torque ($M_{soll}$) of the turbo-charged internal combustion engine (($M_M(n_{L\_min}) \geq M_{soll}$).

6. The method according to claim 1, further comprising the step of setting the turbo-charged internal combustion engine to a higher engine speed ($n_M > n_{L\_min}$) and a higher engine torque ($M_M > M_{VL}(n_{L\_min})$) by increasing engine power and by further engagement of the friction clutch, and maintaining the higher engine speed and the higher engine torque until the friction clutch runs synchronously ($n_M = n_{GE}$), and then completely engaging the friction clutch.

7. The method according to claim 4, further comprising the step of setting the turbo-charged internal combustion engine to a higher engine speed ($n_M > n_{L\_min}$) and a higher engine torque ($M_M > M_{VL}(n_{L\_min})$) by increasing engine power and by further engagement of the friction clutch, and maintaining the higher engine speed and the higher engine torque until the friction clutch runs synchronously ($n_M = n_{GE}$), and then completely engaging the friction clutch; and
   performing the method when a present engine torque ($M_M(n_{L\_min})$) is less than the target torque ($M_{soll}$) of the turbo-charged internal combustion engine ($M_M(n_{L\_min}) << M_{soll}$).

8. The method according to claim 1, further comprising the step of detecting either an existing or an immediately impending torque deficiency of the turbo-charged internal combustion engine when a present engine torque ($M_M$) is either less than or equal to an intake torque ($M_S$) of the turbo-charged internal combustion engine ($M_M \leq M_S$), and when a present engine speed ($n_M$) is less than the boost threshold speed ($n_{L\_min}$) of the turbo-charged internal combustion engine ($n_M < n_{L\_min}$), and when the target torque ($M_{soll}$) of the turbo-charged internal combustion engine is greater than the intake torque ($M_S$) of the turbo-charged internal combustion engine ($M_{soll} > M_S$).

9. The method according to claim 1, further comprising the step of detecting either an existing or an immediately impending torque deficiency of the turbo-charged internal combustion engine when a present drive resistance torque ($M_{FW}$) is greater than the spontaneously attainable maximum torque ($M_{max}$) of the turbo-charged internal combustion engine ($M_{FW} > M_{max}$), and when the target torque ($M_{soll}$) of the turbo-charged internal combustion engine is greater than the present drive resistance torque (($M_{FW}$), ($M_{soll} > M_{FW}$)).

10. The method according to claim 1, further comprising the steps of determining, via one of the engine control unit and the transmission control unit, a present charge pressure ($p_L$) of the turbo-charged internal combustion engine, and detecting either an existing or an immediately impending torque deficiency of the turbo-charged internal combustion engine when the present charge pressure ($p_L$) of the turbo-charged internal combustion engine is less than a boost threshold value ($p_{L\_min}$) characterizing an exhaust gas turbocharger for a charge build-up ($p_L < p_{L\_min}$), and when the turbo-charged internal combustion engine, for creating the target torque ($M_{soll}$), requires a charge pressure ($p_L \geq p_{L\_min}$) lying above the boost threshold value (($p_{L\_min}$), ($M_{soll} > M_S$)).

11. The method according to claim 1, further comprising the step of determining, via one of the engine control unit and the transmission control unit, an engine torque ($M_{VL}(n_M)$) that is attainable using the drive control prior to performing the drive control, and performing the drive control only when the attainable engine torque ($M_{VL}(n_M)$) corresponds at least to a present drive resistance torque (($M_{FW}$), ($M_{VL}(n_M) \geq M_{FW}$)).

12. The method according to claim 11, further comprising the step of determining, via one of the engine control unit and the transmission control unit, the engine torque ($M_M(n_M)$) that is attainable using the drive control from a full load characteristic curve of the turbo-charged internal combustion engine as the full load torque ($M_{VL}(n_M)$) that can be set at a present engine speed ($n_M$).

13. The method according to claim 1, further comprising the step of determining, via one of an engine control unit and a transmission control unit, a thermal loading of the friction clutch caused by the drive control prior to performing the drive control, and performing the drive control only when the determined thermal loading of the friction clutch does not exceed a specified load limit value.

14. The method according to claim 1, further comprising the step of performing the drive control only when a presently engaged gear does not exceed a predetermined maximum gear.

15. The method according to claim 14, further comprising the step of performing the drive control only when another gear, that is lower than the presently engaged gear, is unavailable for a downshift.

16. The method according to claim 1, further comprising the step of performing the drive control only when a presently engaged gear corresponds to a startup gear.

17. The method according to claim 1, further comprising the step of performing the drive control only when a downshift would lead to a vehicle standstill and a subsequent startup.

18. The method according to claim 1, further comprising the step of performing the drive control only when a gas pedal setting attains or exceeds a predetermined limit setting, and the predetermined limit setting being a kick-down setting at which a downshift is initiated in the transmission.

19. The method according to claim 1, further comprising the step only actuating the drive control in the drive train of emergency vehicles, fire trucks, ambulances, and military vehicles, or for off-road travel of the motor vehicle.

20. A method of controlling drive of a commercial motor vehicle to increase torque when a driver demands a target torque ($M_{soll}$) of a drive engine which is above a spontaneously attainable maximum torque ($M_{max}$) of the drive engine, and a drive train of the motor vehicle comprises a turbo-charged internal combustion engine as the drive engine, a turbo-charger which functions in combination with the drive engine to increase drive torque of the drive engine, an automated friction clutch, an automatic stepped transmission and at least one auxiliary consumer being driven by the turbo-charged internal combustion engine, the method of compensating for drive torque supplied to the at least one auxiliary consumer during operation of the commercial motor vehicle comprising the steps of:
  initiating drive control, with either an engine control unit or a transmission control unit, when the target torque of the drive engine, which was demanded by the driver via a gas pedal, is greeter than the sponteneously attainable maximum torque of the drive engine;
  disengaging the friction clutch such that the friction clutch operates in a slip operation;
  accelerating the turbo-charged internal combustion engine to either a load threshold speed ($n_{L\_min}$) or an engine speed ($n_M$) which is above the load threshold speed ($n_{L\_min}$);
  increasing the turbo-charged internal combustion engine up to a substantially full load torque ($M_{VL}(n_{L\_min})$) by engaging the friction clutch and increasing engine power at a substantially constant engine speed ($n_M \approx n_{L\_min}$);
  maintaining the engine speed and the drive engine torque until a drive input and output of the friction clutch are synchronous; and
  completely engaging the friction clutch to terminate the slipping operation of the friction clutch.

* * * * *